(12) United States Patent
Roy et al.

(10) Patent No.: US 11,354,574 B2
(45) Date of Patent: Jun. 7, 2022

(54) INCREASING SECURITY OF NEURAL NETWORKS BY DISCRETIZING NEURAL NETWORK INPUTS

(71) Applicant: Google LLC, Mountain View, CA (US)

(72) Inventors: Aurko Roy, San Francisco, CA (US); Ian Goodfellow, Mountain View, CA (US); Jacob Buckman, San Francisco, CA (US); Colin Abraham Raffel, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/859,789

(22) Filed: Apr. 27, 2020

(65) Prior Publication Data
US 2020/0257978 A1    Aug. 13, 2020

Related U.S. Application Data

(63) Continuation of application No. PCT/US2018/058032, filed on Oct. 29, 2018.

(60) Provisional application No. 62/578,333, filed on Oct. 27, 2017.

(51) Int. Cl.
  *G06N 3/08* (2006.01)
  *G06F 17/16* (2006.01)
  *G06N 3/04* (2006.01)

(52) U.S. Cl.
  CPC ............. *G06N 3/08* (2013.01); *G06F 17/16* (2013.01); *G06N 3/04* (2013.01)

(58) Field of Classification Search
  CPC .................................. G06N 3/08; G06N 3/04
  See application file for complete search history.

(56) References Cited

U.S. PATENT DOCUMENTS

| | | | |
|---|---|---|---|
| 10,248,663 B1 * | 4/2019 | Keisler | G06N 3/0454 |
| 10,432,953 B2 * | 10/2019 | Wierstra | G06N 3/0445 |
| 2018/0260975 A1 * | 9/2018 | Sunkavalli | G06N 3/08 |
| 2019/0035118 A1 * | 1/2019 | Zhao | G06T 5/002 |
| 2019/0094124 A1 * | 3/2019 | Amer | G01K 1/045 |
| 2021/0158450 A1 * | 5/2021 | Davis | G06Q 40/08 |

OTHER PUBLICATIONS

Lu etal, "Effective Data Mining Using Neural Networks", 1996, IEEE Transactions on Knowledge and Data Engineering, vol. 8, No. 6, pp. 957-961. (Year: 1996).*
Kurakin et al, "Adversarial machine learning at scale", Feb. 2017, ICLR, arXiv:1611.01236v2, pp. 1-17. (Year: 2017).*
(Continued)

*Primary Examiner* — Alexey Shmatov
*Assistant Examiner* — Clint Mullinax
(74) *Attorney, Agent, or Firm* — Fish & Richardson P.C.

(57) ABSTRACT

Methods, systems, and apparatus, including computer programs encoded on computer storage media, for increasing the security of neural network by discretizing neural network inputs. One of the methods includes receiving a network input for a neural network; processing the network input using a discretization layer, wherein the discretization layer is configured to generate a discretized network input comprising a respective discretized vector for each of the numeric values in the network input; and processing the discretized network input using the plurality of additional neural network layers to generate a network output for the network input.

18 Claims, 4 Drawing Sheets

(56) References Cited

OTHER PUBLICATIONS

Lee et al., "Generative Adversarial Trainer: Defense to Adversarial Perturbations with GAN", May 2017, arXiv:1705.03387v2, pp. 1-9. (Year: 2017).*

Biggio et al "Evasion attacks against machine learning at test time" Springer, 2013, 16 pages.

Buckman et al, "Thermometer Encoding: One Hot way to Resist Adversarial Examples" ICLR, 2018, 39 pages, 22 pages.

Cisse et al, "Parseval networks: Improving robustness to adversarial examples" International Conference on Machine Learning, 2017, 10 pages.

Goodfellow et al, "Explaining and harnessing adversarial examples" arXiv, 2014, 10 pages.

Goodfellow et al, "Maxout networks" arXiv, 2013, 9 pages.

Han et al, "The influence of the sigmoid function parameters on the speed of backpropagaion learning" From Natural to Artificial Neural Computation, 1995, 7 pages.

He et al, "Deep residual learning for image recognition" IEEE Conference on computer vision and pattern recognition, 2016, 9 pages.

Hochreiter et al., "Long short-term memory" Neural computation, 1997, 46 pages.

Huang et al, "Deep networks with stoachastic depth" Springer, 2016, 15 pages.

Jia et al., "Neural Network Encoding Approach Comparison" An Empirical Study IEEE, 1993, 4 pages.

Kurakin et al, "Adversarial machine learning at scale" arXiv, 2016, 15 pages.

Lin et al, "Delving into transferable adversarial examples and black-box attacks" arXiv, 2016, 24 pages.

Lin et al, "Network in network" arXiv, 2013, 9 pages.

Lu et al, "Effective Data Mining Using Neural Networks" IEEE Transactions on Knowledge and Data Engineering, 1996, 5 pages.

Madry et al, "Towards deep learning models resistant to adversarial attacks" arXiv, 2017, 27 pages.

PCT International Search Report and Written Opinion in International Application No. PCT/US2018/058032, dated Feb. 12, 2019, 15 pages.

Peprnot et al, "Practical black-box attacks against deep learning systems using adversarial examples" arXiv, 2017, 14 pages.

Szegedy et al, "Intriguing properties of neural network" arXiv, 2014, 10 pages.

Van den Oord et al, "Pixel recurrent neural networks" arXiv, 2016, 11 pages.

Xu et al, "Feature squeezing: Detecting adversarial examples in deep neural networks" arXiv, 2017, 15 pages.

Zagoruyko et al, "Wide residual networks" arXiv, 2016, 15 pages.

* cited by examiner

| Real-valued | Quantized | Discretized (one-hot) | Discretized (thermometer) |
|---|---|---|---|
| 0.13 | 0.15 | [0100000000] | [0111111111] |
| 0.66 | 0.65 | [0000001000] | [0000001111] |
| 0.92 | 0.95 | [0000000001] | [0000000001] |

FIG. 4

INCREASING SECURITY OF NEURAL NETWORKS BY DISCRETIZING NEURAL NETWORK INPUTS

CROSS-REFERENCE TO RELATED APPLICATIONS

This application is a continuation of and claims priority to PCT Application No. PCT/US2018/058032, filed on Oct. 29, 2018, which claims priority to U.S. Provisional Application No. 62/578,333, filed on Oct. 27, 2017. The disclosures of the prior applications are considered part of and are incorporated by reference in the disclosure of this application.

BACKGROUND

This specification relates to processing inputs using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

This specification describes a system implemented as computer programs on one or more computers in one or more locations that processes inputs using a deep neural network that includes a discretization layer. In particular, the discretization layer is the input layer of the deep neural network and is configured to generate, for each numeric value in the network input to the neural network, a respective discretized vector. The discretized vectors for the network inputs are then processed by the remaining layers in the neural network to generate a network output, e.g., instead of processing the network input using the remaining layers directly.

For example, when the neural network input is an image that includes one or more intensity values (or "color values") for each of the pixels in the image, the discretization layer generates a respective discretized vector for each of the intensity values before the image is processed by the remaining neural network layers to generate a network output, e.g., to classify the image or to detect locations of objects in the image.

The subject matter described in this specification can be implemented in particular embodiments so as to realize one or more of the following advantages.

By incorporating a discretization layer as described in this specification into a neural network, the neural network becomes less susceptible to adversarial attacks. An adversarial attack occurs when a malicious attacker intentionally submits inputs to the neural network that cause undesired behavior, i.e., incorrect outputs to be generated by the neural network. Thus, the security of the computer system that includes the neural network is improved. The operations performed by the discretization layer decrease susceptibility to adversarial attacks without adversely impacting the performance of the neural network. In particular, because the discretized vectors generated by the discretization layer preserve relative distances between numeric values in network inputs, the network is able to maintain high performance on a variety of machine learning tasks while also becoming less susceptible to adversarial attacks.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 shows example transformed representations for example input values.

Like reference numbers and designations in the various drawings indicate like elements.

DETAILED DESCRIPTION

Figure 1:
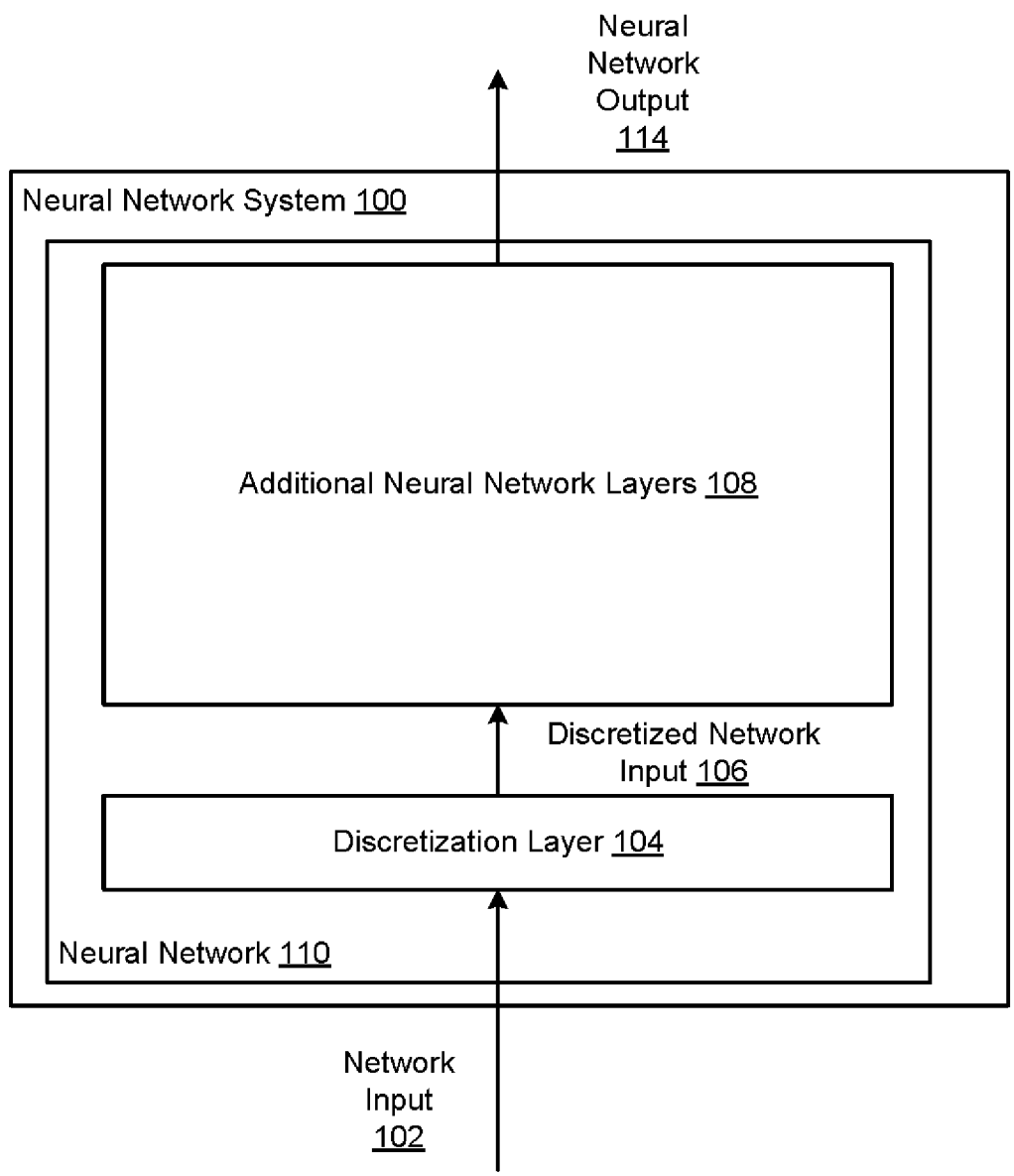
FIG. 1 shows an example neural network system.

This specification generally describes a system that processes network inputs using a deep neural network that includes a discretization layer to generate network outputs.

The neural network can be configured to receive any kind of digital data input as a network input and to generate any kind of network output, i.e., any kind of score, classification, or regression output based on the network input.

For example, the neural network may be an image processing neural network. In particular, if the inputs to the neural network are images or features that have been extracted from images, the output generated by the neural network for a given image may be scores for each of a set of object categories, with each score representing an estimated likelihood that the image contains an image of an object belonging to the category. As another example, the network output can identify locations, e.g., bounding boxes, in the input image that are likely to include an image of an object. As another example, the network output can be a distribution that defines a modified image, e.g., an image that has been generated from the input image. As another example, the network output can define a segmentation map of the input image.

As another example, if the inputs to the neural network are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

FIG. 1 shows an example neural network system 100. The neural network system 100 is an example of a system implemented as computer programs on one or more computers in one or more locations, in which the systems, components, and techniques described below are implemented.

As described above, the system 100 receives a network input 102 and processes the network input 102 using a neural network 110 to generate a network output 114. Each network input 102 generally includes multiple numeric values from a given space of numeric values.

The neural network 110 includes a discretization layer 104 and additional neural network layers 108. The discretization layer 104 is configured to receive the network input 102 and to process the network input 102 to generate a discretized network input 106. The additional neural network layers 108 are then configured to process the discretized network input 106 generated by the discretization layer 104 to generate the network output 114.

The number and architecture of the additional neural network layers 108 can vary depending on the task that the neural network is configured to perform, i.e., on the kind of network input the neural network is configured to receive and the kind of network output that the neural network is configured to generate.

For example, when the input 102 is an image, the additional neural network layers 108 can be a deep convolutional neural network that is configured to generate a network output from the input image. As another example, for sequencing processing tasks, the additional neural network layers can be a recurrent neural network or a self-attention-based neural network.

The discretization layer 104 is configured to transform the network input 102 to make the neural network 110 more resistant to adversarial attack and to increase the security of the system 100.

As described above, an adversarial attack occurs when a malicious attacker intentionally submits inputs to the neural network that cause undesired behavior, i.e., incorrect outputs to be generated by the neural network. In many cases, the inputs are minimally perturbed from real inputs with the aim of causing the neural network to make an incorrect prediction, i.e., a prediction different from the one that would have been made for the corresponding real input. To prevent maliciously submitted inputs from causing mis-predictions and to make the neural network 110 more robust to adversarial attack, the discretization layer 104 applies a non-differentiable and strongly non-linear transformation to the network input 102 to generate the discretized input 106.

More specifically, rather than replacing a real number with a number of low bit depth, i.e., rather than quantizing the numeric values in the network input 102 as in some conventional approaches, the discretization layer 104 replaces each numeric value in the network input 102 with a binary vector (referred to in this specification as a "discretized vector") to generate the discretized input 106.

Different values of the real number activate different bits of the binary vector. Multiplying a given vector by the neural network's parameters thus results in different input values actually using different parameters of the network 110. Thus, as will be described in more detail below, discretization defends against adversarial examples by changing which parameters of the network 110 are used, and may also discard information if the number of partitions is low.

However, the discretization performed by the discretization layer 104 also preserves relative distances between the numeric inputs, thereby preventing the inclusion of the layer 104 in the neural network 100 from adversely impacting the performance of the neural network 100, i.e., preventing the accuracy of the predictions generated by the neural network 100 from degrading as a result of modifying the network 100 to include the layer 104.

The operation of the discretization layer 104 will be described in more detail below with reference to FIGS. 2-4.

Figure 2:
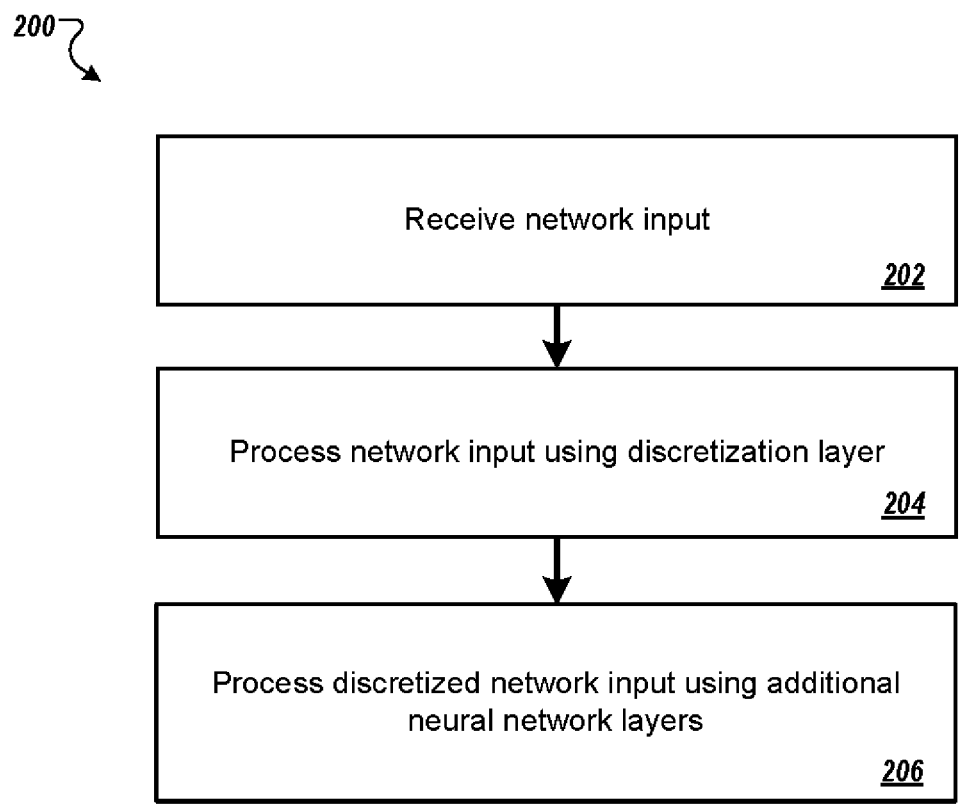
FIG. 2 is a flow chart of an example process for processing a network input using a neural network that includes a discretization layer.

FIG. 2 is a flow diagram of an example process 200 for processing a network input using a neural network that includes a discretization layer. For convenience, the process 200 will be described as being performed by a system of one or more computers located in one or more locations. For example, a neural network system, e.g., the neural network system 100 of FIG. 1, appropriately programmed, can perform the process 200.

The system receives a network input (step 202). The network input includes multiple numeric values, each belonging to a space of possible network inputs. When the network input is an RGB image, for example, the network input is an H×W×3 tensor of numeric values, where H and W are the height and width of the image in pixels, respectively. The numeric values may be floating point values or may be represented in a different number format.

The system processes the network input using the discretization layer (step 204). The discretization layer is configured to process the network input to generate a discretized network input that includes a respective discretized vector for each numeric value in the network input. Thus, in a simplified example, when each discretized vector has three entries and the input is the H×W×3 image, the discretized network input includes a respective three-dimensional vector for each numeric value in the H×W×3 image. For example, the discretized network input may be represented as an H×W×9 tensor, with the first three dimensions of the 9 z dimensions corresponding to the discretized vectors for the R color values, the next three dimensions of the 9 z dimensions corresponding to the discretized vectors for the G color values, and the last three dimensions of the 9 z dimensions corresponding to the discretized vectors for the B color values.

More specifically, each discretized vector has a respective entry for each of a plurality of partitions of the space of possible numeric values. As a simplified example, if the inputs are real values in the range of 0.0 to 1.0 and there are three partitions, the discretized vector may include one entry for the partition [0.0,1/3), another entry for the partition

[1/3,2/3], and another entry for the partition (2/3, 1.0]. Generally, the entries in the discretized vector are ordered from an entry for a lowest partition of the space to an entry for a highest partition of the space. Continuing the above example, the discretized value would then be expressed as follows: {entry for the partition [0.0,1/3), entry for the partition [1/3,2/3), entry for the partition (2/3,1.0]}.

Generating the discretized vector for each of the numeric values in the network input is described in more detail below with reference to FIG. 3.

The system processes the discretized network input using the additional or remaining neural network layers in the neural network to generate the network output (step 206). Thus, the additional neural network layers process the discretized network input in place of the network input. Processing the discretized network input in place of the network input makes the neural network less susceptible to adversarial attacks and, because of the way in which the discretized network input is generated, does not adversely impact the performance of the neural network.

Figure 3:
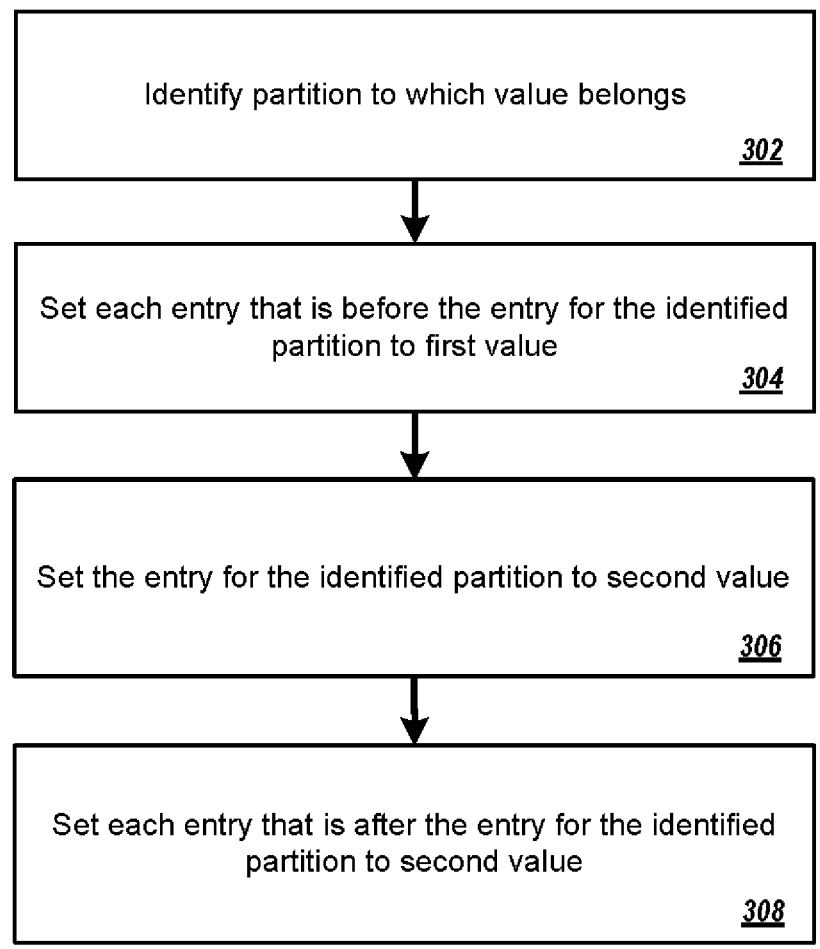
FIG. 3 is a flow chart of an example process for generating a discretized vector for an input numeric value.

FIG. 3 is a flow diagram of an example process 300 for generating a discretized vector for a numeric value. For convenience, the process 300 will be described as being performed by a system of one or more computers located in one or more locations. For example, a discretization layer in a neural network system, e.g., the discretization layer 104 of the neural network system 100 of FIG. 1, appropriately programmed, can perform the process 100.

The discretization layer can perform the process 300 for each numeric value in the network input to generate a respective discretized vector for each numeric value.

The discretization layer identifies the partition to which the numeric value belongs (step 302).

The discretization layer sets, in the discretized vector for the numeric value, each entry that is before the entry for the identified partition to a first value (step 304). For example, the first value can be zero.

The discretization layer sets, in the discretized vector for the numeric value, the entry for the identified partition to a second value (step 306). For example, the second value can be one.

The discretization layer sets, in the discretized vector for the numeric value, each entry that is after the identified partition to the second value (step 308).

Thus, the discretized vector can be considered to be a binary vector because each entry in the vector is set to either the first value or the second value.

In the particular example where the first value is zero and the second value is one, the generated discretized vector for the numeric value has zeroes at entries that correspond to any entries before the identified partition and ones at entries at and after the entry for the identified partition.

FIG. 4 shows example transformed representations for example input values. In particular, FIG. 4 shows transformed representations of real-valued inputs generated using three techniques: quantizing ("quantized"), one-hot encoding ("discretized (one-hot)"), and the techniques described in this specification ("discretized (thermometer)"). Taking the real-valued input of 0.13 as an example, the quantizing transforms the value into a single value 0.15.

One-hot encoding transforms the value into a one-hot encoded vector [0100000000] that has only a single non-zero value for the partition corresponding to 0.13 and zeroes for all other values. However, as can be seen from the examples of FIG. 4, relative distances between real values are lost by one-hot encoding whenever two real values belong to different partitions, i.e., because the distance between any two one-hot encoded vectors is the same so long as the corresponding real values belong to different partitions. The described techniques, on the other hand, transform the value into a discretized vector [0111111111] that has non-zero values not only at the entry for the partition corresponding to 0.13 but also at all entries after the entry for the partition. This scheme preserves the relative distances between the real values. In particular, the distance between two discretized vectors is dependent on how close the two partitions are for the corresponding real values.

More specifically, in the example of FIG. 4, the input space of the input values is [0.00, 1.00] and the input space is partitioned into ten evenly spaced partitions. Thus, both the one-hot encoding and the thermometer encoding discretized vectors have ten entries. Because the value 0.13 falls into the second partition of the ten evenly spaced partitions, the one-hot encoding vector has a single non-zero value at the second entry of the one-hot encoded vector. The thermometer encoding discretized vector, on the other hand, has a non-zero value not only at the second entry of the vector but also at all entries following the second entry in the vector.

In some implementations, the neural network system trains the neural network using adversarial training to determine trained values of the parameters of the additional neural network layers in the neural network (the discretizing neural network layer does not have any trainable parameters) and to increase the robustness of the neural network to adversarial attack. As part of an example adversarial training technique, the system can repeatedly perform the following operations on different training network inputs. In particular, the system can obtaining a target network output for the network input, where the target network output is the output that should be generated by the neural network for the network input. The system can generate an adversarial input from the network input, e.g., by applying an adversarial perturbation to the network input, and process both the training network input and the adversarial input using the neural network to generate a network output for both the training network input and the adversarial input.

The system can then determine a gradient with respect to the parameters of the neural network of an objective function that depends on (i) an error between the target network output and the network output for the training network input and (ii) an error between the target network output and the network output for the adversarial input; and adjust current values of the parameters using the gradient. For example, the objective function can be a maximum likelihood objective function or a cross entry loss function.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for generating a network output for a network input that includes an image, the method comprising:

receiving a network input for a neural network comprising a discretization layer followed by a plurality of additional neural network layers, the network input comprising an H×W×3 tensor of numeric values from a space of possible numeric values, wherein the numeric values are floating point values and each numeric value is a respective intensity value for a corresponding pixel in the image, wherein H is a height of the image in pixels and W is a width of the image in pixels;

processing the network input using the discretization layer, wherein the discretization layer is configured to generate a discretized network input comprising a respective discretized vector for each of the respective intensity values for each of the corresponding pixels in the image that are in the H×W×3 tensor before the image is processed by additional neural network layers, wherein each discretized vector has a respective entry for each of a plurality of partitions of the space of possible numeric values, wherein the discretized vectors generated by the discretization layer preserve relative distances between the respective intensity values, and wherein generating the discretized network input comprises, for each of the numeric values:

identifying the partition to which the numeric value belongs;

setting, in the discretized vector for the numeric value, each entry that is before the entry for the identified partition to a first value, setting, in the discretized vector for the numeric value, the entry for the identified partition to a second value, and setting, in the discretized vector for the numeric value, each entry that is after the entry for the identified partition to the second value; and processing the discretized network input using the plurality of additional neural network layers to generate a network output for the network input.

2. The method of claim 1, wherein the first value is zero.

3. The method of claim 1, wherein the second value is a positive value.

4. The method of claim 3, wherein the second value is one.

5. The method of claim 1, wherein the entries in the discretized vector are ordered from an entry for a lowest partition of the space to an entry for a highest partition of the space.

6. The method of claim 1, further comprising:

training the neural network using adversarial training, comprising:

obtaining a target network output for the network input;

generating an adversarial input from the network input;

processing the adversarial input using the neural network to generate a network output for the adversarial input;

determining a gradient with respect to the parameters of the neural network of an objective function that depends on (i) an error between the target network output and the network output for the network input and (ii) an error between the target network output and the network output for the adversarial input; and adjusting current values of the parameters using the gradient.

7. A system comprising one or more computers and one or more storage devices storing instructions that when executed by the one or more computers cause the one or more computers to perform operations for generating a network output for a network input that includes an image, the operations comprising:

receiving a network input for a neural network comprising a discretization layer followed by a plurality of additional neural network layers, the network input comprising an H×W×3 tensor of numeric values from a space of possible numeric values, wherein the numeric values are floating point values and each numeric value is a respective intensity value for a corresponding pixel in the image, wherein H is a height of the image in pixels and W is a width of the image in pixels;

processing the network input using the discretization layer, wherein the discretization layer is configured to generate a discretized network input comprising a respective discretized vector for each of the respective intensity values for each of the corresponding pixels in the image that are in the H×W×3 tensor before the image is processed by additional neural network layers, wherein each discretized vector has a respective entry for each of a plurality of partitions of the space of possible numeric values, wherein the discretized vectors generated by the discretization layer preserve relative distances between the respective intensity values, and wherein generating the discretized network input comprises, for each of the numeric values:

identifying the partition to which the numeric value belongs;

setting, in the discretized vector for the numeric value, each entry that is before the entry for the identified partition to a first value, setting, in the discretized vector for the numeric value, the entry for the identified partition to a second value, and setting, in the discretized vector for the numeric value, each entry that is after the entry for the identified partition to the second value; and processing the discretized network input using the plurality of additional neural network layers to generate a network output for the network input.

8. One or more non-transitory computer-readable storage media storing instructions that when executed by one or more computers cause the one or more computers to perform operations for generating a network output for a network input that includes an image, the operations comprising:

receiving a network input for a neural network comprising a discretization layer followed by a plurality of additional neural network layers, the network input comprising an H×W×3 tensor of numeric values from a space of possible numeric values, wherein the numeric values are floating point values and each numeric value is a respective intensity value for a corresponding pixel in the image, wherein H is a height of the image in pixels and W is a width of the image in pixels;

processing the network input using the discretization layer, wherein the discretization layer is configured to generate a discretized network input comprising a respective discretized vector for each of the respective intensity values for each of the corresponding pixels in the image that are in the H×W×3 tensor before the image is processed by additional neural network layers, wherein each discretized vector has a respective entry for each of a plurality of partitions of the space of possible numeric values, wherein the discretized vectors generated by the discretization layer preserve relative distances between the respective intensity values, and wherein generating the discretized network input comprises, for each of the numeric values:

identifying the partition to which the numeric value belongs;

setting, in the discretized vector for the numeric value, each entry that is before the entry for the identified partition to a first value, setting, in the discretized vector for the numeric value, the entry for the identified partition to a second value, and setting, in the discretized vector for the numeric value, each entry that is after the entry for the identified partition to the second value; and processing the discretized network input using the plurality of additional neural network layers to generate a network output for the network input.

9. The system of claim 7, wherein the first value is zero.

10. The system of claim 7, wherein the second value is a positive value.

11. The system of claim 10, wherein the second value is one.

12. The system of claim 7, wherein the entries in the discretized vector are ordered from an entry for a lowest partition of the space to an entry for a highest partition of the space.

13. The system of claim 7, the operations further comprising:

training the neural network using adversarial training, comprising:

obtaining a target network output for the network input;

generating an adversarial input from the network input;

processing the adversarial input using the neural network to generate a network output for the adversarial input;

determining a gradient with respect to the parameters of the neural network of an objective function that depends on (i) an error between the target network output and the network output for the network input and (ii) an error between the target network output and the network output for the adversarial input; and adjusting current values of the parameters using the gradient.

14. The computer-readable storage media of claim 8, wherein the first value is zero.

15. The computer-readable storage media of claim 8, wherein the second value is a positive value.

16. The computer-readable storage media of claim 15, wherein the second value is one.

17. The computer-readable storage media of claim 8, wherein the entries in the discretized vector are ordered from an entry for a lowest partition of the space to an entry for a highest partition of the space.

18. The computer-readable storage media of claim 8, the operations further comprising:

training the neural network using adversarial training, comprising:

obtaining a target network output for the network input;

generating an adversarial input from the network input;

processing the adversarial input using the neural network to generate a network output for the adversarial input;

determining a gradient with respect to the parameters of the neural network of an objective function that depends on (i) an error between the target network output and the network output for the network input and (ii) an error between the target network output and the network output for the adversarial input; and adjusting current values of the parameters using the gradient.

* * * * *